Nov. 26, 1957  L. BLASCZYK  2,814,528
DEVICE FOR APPLYING SOLUBLE FERTILIZER
Filed Feb. 1, 1954
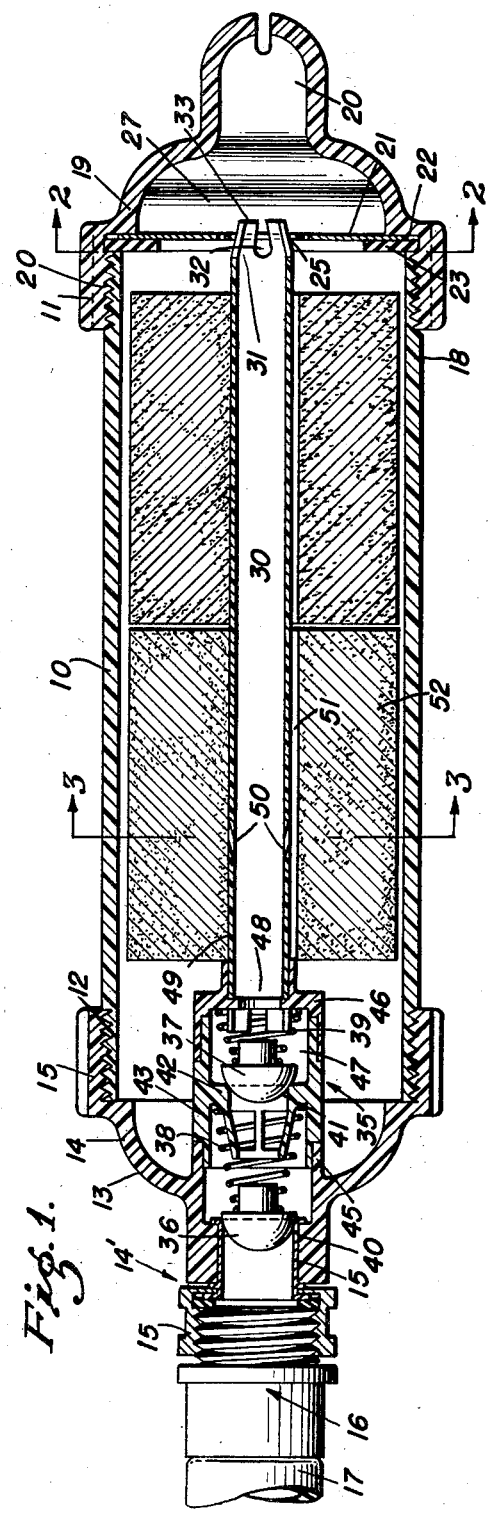
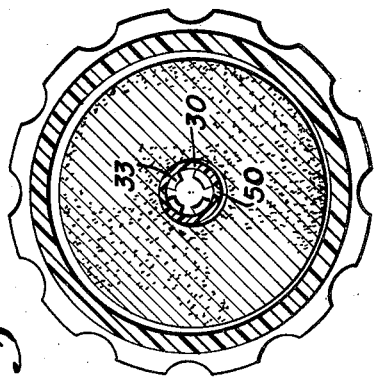
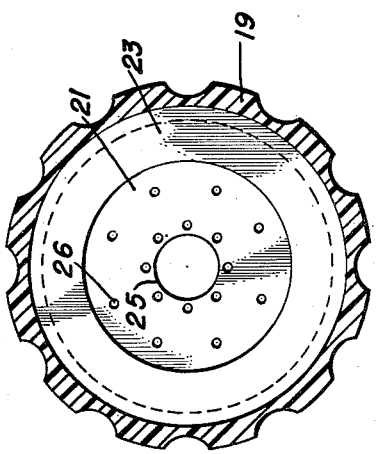
LEON BLASCZYK
Inventor.
By *Jesse P. Whann*
Attorney

United States Patent Office 2,814,528
Patented Nov. 26, 1957

2,814,528

DEVICE FOR APPLYING SOLUBLE FERTILIZER

Leon Blasczyk, Glendale, Calif.

Application February 1, 1954, Serial No. 407,527

3 Claims. (Cl. 299—83)

My invention relates to a device for applying substances to soils and to plant life to promote growth thereof.

It is an object of the invention to provide a device for dissolving in water briquettes such as disclosed in my application, Serial No. 109,025, filed August 6, 1949, now Patent No. 2,667,663, for a method and means for adding substances to soils, and for applying the solution to the soil or to plant life and soil in which the plant life is growing.

The invention is of a special utility in garden care as a means for applying nitrogen to the soil or for applying pest controls to plants and to the soil. Nitrogen in some form is necessary if plant health and growth are to be maintained. Some growing plants have the power to absorb and assimilate the traces of free nitrogen from the air, but all plants are capable of absorbing nitrogen through their roots. In my present invention I provide an effective, easily used device which may be attached to a hose nozzle, and hold so as to be dissolved in the water a briquette containing ammoniacal nitrogen and other plant foods, as described in my copending application referred to above. It is an object of the invention to provide in this device means to support the briquette and means for feeding water into the chamber which holds the briquette in such a manner that a solution of predetermined strength will be formed. Accordingly, the solution may be sprayed directly upon the plant life, such as a lawn, and on the soil without danger of injury to the plant life.

Further objects and advantages of the invention will be brought out in the following part of the specification wherein I have described the details of a preferred embodiment of my invention for the purpose of disclosure, without intention, however, to limit the scope of the invention set forth in the appended claims.

Referring to the drawings which are for illustrative purposes only:

Fig. 1 is a longitudinal section through a preferred form of the invention;

Fig. 2 is a cross-section taken substantially as indicated by the line 2—2 of Fig. 1 to show the arrangement of perforation in a plate forming part of the device;

Fig. 3 is a sectional view taken substantially as indicated by the line 3—3 of Fig. 1.

The device, as shown in Fig. 1, has a tubular shell 10 of transparent plastic, having threads 11 at its front end and threads 12 at its other end. An attachment device 13 is connected to one end of the shell 10, this attachment having a bell shaped wall 14 and an annular wall 15 which is screwed onto the thread 12 of the shell 10. At the leftward end of the attachment 13 there is hose coupling means 14' comprising an inserted metal sleeve 15 on which an internally threaded bushing 15 is rotatably mounted for connection to a companion hose coupling part 16 which is fastened to the end of the hose 17. At the front end 18 of the shell 10 there is a removable head member 19 having an annular wall 20 which is internally threaded so that it may be screwed onto the threads 11 of the shell 10. At the front end of the head 19 there is means for egress of water-plant food solution, consisting of a spray nozzle 20.

Disposed in transverse relation to the front end of the tubular shell 10 there is a perforated plate 21 which is held against a shoulder 22 in the head 19 by a rubber washer 23 which likewise seals the threaded joint between the head 19 and the threads 11 at the front end of the shell 10 when the head 19 is screwed on to the shell 10 as shown in Fig. 1. The plate 21 has a central opening 25 and the plurality of smaller openings 26 connecting the interior of the shell 10 with the space 27 within the head 19.

A tube 30, extended axially within the shell 10 has its front end connected to the hose connection 14' and has its front end 31 engaging and being supported by the plate 21. The front end 31 of the tube 30 has notches 32 cut therein so as to form spaced fingers 33, which fingers are bent inwardly, as shown in Figs. 1 and 3 so that portions thereof will enter the central opening 25 of the plate 21. The leftward ends of the notches 32 lie to the left of the plate 21 so as to form opening communicating with the interior of the tubular shell 10.

The leftward end of the tube 30 is connected to the hose connection 14' through duplex check valve means 35. This check valve means comprises two rubber closures 36 and 37 which are urged by coil springs 38 and 39 into closing relation to valve ports 40 and 41. The port 40 is formed at the rightward end of the sleeve 15 and the port 41 is formed in the transverse wall 42 of a molded cylinder 43. The bell shaped portion 14 of the attachment device 13 has a cylindrical wall 45 into which the leftward end of the cylindrical part 43 is fitted, thereby forming a chamber in which the closure 36 operates. Of the rightward end of the cylindrical part 43 there is a cap 46 which defines a chamber 47 for the closure 37. The cap 46 has an opening 48 which receives the leftward end 49 of the tube 30, whereby connection of the tube 30 with the hose connection 14' is made.

In addition to the openings at the rightward end thereof, the tube 30 has intermediate openings 50 which are spirally and outwardly directed so as to discharge water from the interior of the tube 30 into the axial opening 51 of a briquette 52 which is placed in the chamber defined by the tubular shell 10. For ease of handling the briquette 52 is made in two parts, and it is made from a material or materials which dissolve in water. The briquette 52 is characterized by a slow rate of dissolution, and the flow of water through the opening 50 is so proportioned to the flow of water through the openings at the rightward end of the tube 50 that a very weak solution is formed which may be sprayed directly on to grass or other plant life, and on to the soil to fertilize the same without danger to the grass or other plant life. The openings in the tube 30, being arranged on lines which extend spirally and outwardly, direct water streams into the axial openings 51, causing the water to flow spirally within the briquette 52 which is supported on the tube 30 within the shell 10.

I claim:

1. In a hose nozzle of the character described for dissolving in a flow of water from the hose a soluble plant food briquette having a longitudinal opening axially therethrough, the combination of: a tubular shell of a diameter and length to receive the briquette therein, the front end of said shell being threaded; an attachment member having an annular wall at one end connected to the rear end of said shell and a hose connection at the other end; a head having an annular wall at its inner end making threaded connection with the front end of said shell and having at the front end thereof a spray nozzle; a transverse perforated plate arranged in said head across the front end of said shell; a tube extending axially within said shell and being arranged to extend through the opening of the briquette, said tube having one end connected to said hose connection of said attachment member so as to receive water therefrom and having its other end engaging and being supported by said plate which is arranged across the front end of said shell, said tube having at the front end thereof and intermediate its ends openings for flow of water, said intermediate opening being disposed in the wall of said tube so as to deliver water spirally and forwardly from the interior of said tube to the interior of the briquette surrounding the tube.

2. In a hose nozzle of the character described for dissolving in a flow of water from the hose a soluble plant food briquette having a longitudinal opening axially therethrough, the combination of: a tubular shell of a diameter and length to receive the briquette therein, one end of said shell being threaded for disengageable connection to the part of the nozzle adjacent thereto; an attachment member having an annular wall at one end connected to the rear end of said shell and a hose connection at the other end; a head having an annular wall at its inner end making connection with the front end of said shell and having at the front end thereof an opening for the egress of water-plant food solution; a transverse perforated plate arranged in said head across the front end of said shell; a tube extending axially within said shell and being arranged to extend through the opening of the briquette, said tube having one end connected to said hose connection of said attachment member so as to receive water therefrom and having its other end engaging and being supported by said plate which is arranged across the front end of said shell, said tube having at the front end thereof and intermediate its ends openings for flow of water, said intermediate opening being disposed in the wall of said tube so as to deliver water from the interior of said tube to the interior of the briquette surrounding the tube.

3. A device as defined in claim 1, wherein said intermediate opening has a tangential component so that water will be caused to move spirally within said shell.

References Cited in the file of this patent
UNITED STATES PATENTS

| | | |
|---|---|---|
| 2,218,790 | Gifford | Oct. 22, 1940 |
| 2,220,227 | Gifford | Nov. 5, 1940 |
| 2,481,279 | Barr | Sept. 6, 1949 |
| 2,590,353 | Schaar | Mar. 25, 1952 |
| 2,593,178 | Paul | Apr. 15, 1952 |
| 2,641,507 | McGregor | June 9, 1953 |
| 2,667,663 | Blasczyti | Feb. 2, 1954 |